Patented July 10, 1945

2,380,057

UNITED STATES PATENT OFFICE 2,380,057

DIALKYLATED SILICON ESTERS AND METHOD OF MAKING THEM

Rob Roy McGregor, Swissvale, and Earl Leathen Warrick, Westview, Pa., assignors to Corning Glass Works, Corning, N. Y., a corporation of New York No Drawing. Application October 23, 1941, Serial No. 416,285

3 Claims. (Cl. 260—462)

This invention relates to the alkylation of silicon compounds, particularly the silicon esters such as ethyl orthosilicate—$Si(OC_2H_5)_4$. It is known that such esters can be alkylated by means of the Grignard reaction which comprises forming an alkyl magnesium Grignard reagent in an ether solution and reacting the ester therewith, thus:

$$RMgX + Si(OC_2H_5)_4 \rightarrow RSi(OC_2H_5)_3 + OC_2H_5MgX$$

where R is an alkyl radicle and X is a halide. Since the magnesium Grignard reagent is an unstable compound and is not readily isolated per se, it has been customary to prepare it separately in an ether solution and to conduct subsequent reactions with such solution. Grignard reagents which are prepared in ether solution are generally considered to be ether complexes

$$RMgX \cdot O(C_2H_5)_2$$

It may be that such Grignard ether complexes are unable to cause disubstitution of a silicon orthoester because, insofar as we are aware, no one has succeeded in substituting more than one alkyl radicle in a silicon orthoester by means of this reaction even though the use of an excess of the magnesium Grignard. Khotinsky and Seregenoff, Berichte vol. 41, page 2946 (1908), stated that the ethyl ester of silicic acid reacts in the same way as the ethyl ester of carbonic acid in that only one ethoxyl group is replaced by an organic radicle. Chas. Courtot, in his book entitled "Le Magnesium en Chimie Orga.ü ,ue" (1926), states on page 124 "It is impossible to replace more than one ethoxy with an organic radicle even by employing a large excess of magnesium Grignard." It is desirable to bring about disubstitution because dialkyl silicon compounds are useful in the preparation of various derivatives having valuable properties.

An object of this invention is to produce dialkylated silicon esters in a simple and economical manner.

Another object is to alkylate a silicon ester in the absence of ether or other solvent.

To these and other ends the invention comprises reacting halide of an alkyl hydrocarbon radicle, which is capable of forming a magnesium Grignard, with a mixture of metallic magnesium and a silicon orthoester in the absence of ether and other solvents.

The practice of our invention has resulted in a new and valuable composition of matter, dimethyldiethoxysilicane, which insofar as we are aware has not hitherto been produced and which, although it is an organic compound, contains a relatively high percentage of silicon and has properties making it a valuable starting material for many purposes.

We have discovered that a silicon orthoester can be dialkylated by means of a nascent magnesium alkyl Grignard in the absence of ether. In other words, disubstitution occurs when the Grignard reagent, instead of being prepared separately in an ether solution before mixing it with the ester to be alkylated, is formed in situ in contact with the ester and in the absence of ether. The reaction products contain about two-thirds as much of the dialkylated ester as they do of the monoalkylated ester. The useful alkylated fractions of the reaction productse can be separated from the residual magnesium salts by direct fractional distillation, thereby affording a better yield than the conventional method and avoiding the additional step of extraction with a solvent.

In the preparation of many magnesium Grignard reagents not all of the magnesium is reacted, probably because it becomes coated with salts and other by-products. Hence a 100% yield of the reagent based on the amount of magnesium employed cannot always be expected. The same holds true with our process wherein the Grignard reagent is formed in situ. However, when equimolecular quantities of the alkyl halide, the silicon orthoester and magnesium are used we have obtained products which contain about two-thirds as much of the dialkylated ester as they do of the mono-alkylated ester. Based on the results of our experiments the reaction is believed to proceed according to the following general equation which does not take into account the possible formation of small amounts of the trialkylated ester and complex derivatives:

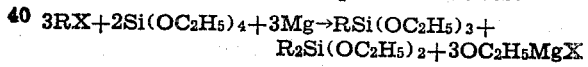
$$3RX + 2Si(OC_2H_5)_4 + 3Mg \rightarrow RSi(OC_2H_5)_3 + R_2Si(OC_2H_5)_2 + 3OC_2H_5MgX$$

R is an alkyl hydrocarbon radicle which is capable of forming a magnesium Grignard and X is a halide.

The reaction of metallic magnesium with an alkyl chloride does not start as readily as with an alkyl bromide and when the chloride is employed it is usually necessary to initiate the reaction by the addition of a small amount of a starting catalyst such as ethyl bromide preferably in conjunction with iodine after which the reaction with the chloride proceeds readily.

When the alkyl halide is one which is gaseous at room temperature it is advantageous to conduct the reaction in a closed container and under pressure.

*Example I*

One hundred four pounds of ethyl orthosilicate is added to twelve pounds of magnesium ribbon in a pressure tight reaction vessel. Methyl chloride gas is then introduced into the mixture until the ethyl silicate is saturated with the gas, as indicated by the development of a slight pressure. The charging hole is then opened and sufficient ethyl bromide or similar starting catalyst is added to activate the magnesium. A few crystals of iodine are also added. When the reaction has begun the vessel is sealed and methyl chloride gas is again introduced therein until a total of 25 pounds has been added, which may be accomplished rapidly or more gradually but at such a rate that a pressure is maintained in the vessel. At the same time the mixture is stirred. As the reaction proceeds heat is developed and the pressure rises in consequence. After the total quantity of methyl chloride has been added, stirring is continued until both the temperature and the pressure begin to subside, which indicates that the reaction is concluded. The reaction products are distilled directly from the residual solids which comprise mostly magnesium ethoxy chloride and unreacted magnesium. The distillate is then fractionally distilled and produces about 12.5 pounds of dimethyldiethoxysilicane (111°–114° C.) and about 20 pounds of monomethyltriethoxysilicane (141°–145° C.) which amounts to a total yield of about 56% based on the magnesium.

The quantities of reactants employed in the above examples correspond to equimolecular proportions on a half molar basis in accordance with the above recited equation. However, as pointed out above, not all of the magnesium can be reacted and some methyl chloride and ethyl silicate likewise are left. From the residual sludge of the reaction it is possible to separate 20%–25% of unreacted magnesium which can be used in subsequent runs. On the basis of the total amount of magnesium which is thus actually used up and lost, the total yield of useful alkylated esters becomes about 75%. The residual unreacted methyl chloride is largely lost during distillation of the products of reaction. Hence, although a full molar quantity of magnesium is required for each run, the amount of methyl chloride can be reduced by 10% to 20% with consequent saving in expense.

The residual unalkylated ethyl silicate can be recovered by fractional distillation or can be returned to the reaction vessel without separating it from the monomethyltriethoxysilicane. By establishing such a cycle of operations, we have found that the individual yield of dimethyldiethoxysilicane can be greatly increased and on the half molar basis described above about twenty pounds of the dimethylated product per run can be obtained. This is accomplished by returning to the reaction vessel all of the product from the preceding run which boils above about 114° C. and adding to it about 28 pounds of fresh ethyl silicate and the requisite amount of magnesium and methyl chloride as shown above.

Dimethyldiethoxysilicane is a clear, colorless liquid boiling at 114° C. and 740 mm. Its molecular weight was found to be 140, calculated 148. It has a specific gravity of 0.830. Analysis showed it to contain 48.4% C and silicon equivalent to 40.1% $SiO_2$, calculated 48.6% C and 40.5% $SiO_2$. This data corresponds to the formula $(CH_3)_2Si(OC_2H_5)_2$. The compound is soluble in alcohol, benzene, toluene, acetone, dioxan, etc. Water decomposes or hydrolyzes it to form dimethyl silicone $[(CH_3)_2SiO]_x$. It burns readily in air and gives off a smoke of finely divided silica. To the best of our knowledge and belief we are the first to prepare this compound and we have found it to be an excellent and particularly desirable starting material or source for dimethyl silicone and other valuable organo-silicon derivatives.

*Example II*

One hundred and four pounds of ethyl orthosilicate is added to twelve pounds of magnesium ribbon in a pressure tight reaction vessel. Ethyl bromide and iodine are added to initiate reaction after which the vessel is closed and ethyl chloride gas to the total amount of about 32 pounds is let in. The mixture is stirred. As the reaction proceeds, heat and pressure are developed. The conclustion of the reaction is evidenced by drop of pressure and temperature. The reaction products may be distilled directly from the mixture.

Due to the similarity of the boiling points of the various ethyl substituted esters we have not been able to make a sufficiently sharp separation of the various reaction products to determine the yields of each. The boiling range of the product is from 155° to 165° C. at 740 mm.

Ethyl bromide in equivalent molecular amount may be substituted for ethyl chloride. In this case a pressure vessel is not necessary for economical operation, provided an adequate condenser is used to return to the reaction the ethyl bromide which is volatilized by the heat of reaction.

*Example III*

Butyl chloride may be substituted in equivalent molecular amount for ethyl chloride in Example II and the reaction may be carried out in a pressure vessel or in a vessel equipped with an adequate condenser. Distillation of the product gives a yield, based on half molar quantities of about 12.2 pounds dibutyldiethoxysilicane, 9.4 pounds monobutyltriethoxysilicane, 7.3 pounds of tributylmonoethoxysilicane and 9.9 pounds of mixed product which amounts to a total yield of about 64% based on the magnesium.

*Example IV*

Amyl chloride in equivalent molecular amount may be substituted for ethyl chloride in Example II and the reaction may be carried out in a pressure vessel or in a vessel equipped with an adequate condenser. Distillation of the product gives a yield, based on half molar quantities, of about twenty pounds of monoamyltriethoxysilicane, 2.7 pounds of diamyldiethoxysilicane and ten pounds of triamylmonoethoxysilicane, which amounts to a total yield of about 42% based on the magnesium.

In the foregoing examples other orthoesters of silicon can be employed in lieu of ethyl silicate. However, methyl orthosilicate is very toxic and the higher esters are expensive, have successively lower silicon contents and react progressively more slowly as their molecular weight increases. Hence we prefer to use ethyl silicate.

We claim:
1. Dimethyldiethoxysilicane.
2. The method of making dimethyldiethoxysilicane which comprises reacting a methyl halide with metallic magnesium and ethyl orthosilicate in the absence of solvent, allowing the reaction to continue until a substantial quantity of dimethyldiethoxysilicane is obtained, fractionally distilling the product and recovering dimethyldiethoxysilicane.

3. The method of making dimethyl diethoxy silicane which comprises reacting methyl chloride with metallic magnesium and ethyl orthosilicate in the absence of solvent, fractionally distilling the reaction product, and recovering therefrom dimethyl diethoxy silicane.

ROB ROY McGREGOR.
EARL LEATHEN WARRICK.